United States Patent
Meidan et al.

(10) Patent No.: US 12,326,512 B2
(45) Date of Patent: *Jun. 10, 2025

(54) SYSTEM AND METHOD FOR CLASSIFYING A MODE OF OPERATION OF A MOBILE COMMUNICATION DEVICE IN A VOLUME BASED ON SENSOR FUSION

(71) Applicant: SAVERONE 2014 LTD., Petah Tikva (IL)

(72) Inventors: Aviram Meidan, Yehud-Monosson (IL); Yiftach Richter, Kochav Yair (IL); Daniel Aljadeff, Kiriat Ono (IL)

(73) Assignee: SAVERONE 2014 LTD., Petach-Tikva (IL)

( * ) Notice: Subject to any disclaimer, the term of this patent is extended or adjusted under 35 U.S.C. 154(b) by 514 days.

This patent is subject to a terminal disclaimer.

(21) Appl. No.: 17/679,208

(22) Filed: Feb. 24, 2022

(65) Prior Publication Data

US 2023/0026593 A1    Jan. 26, 2023

Related U.S. Application Data

(60) Provisional application No. 63/223,980, filed on Jul. 21, 2021.

(51) Int. Cl.
*G01S 5/02* (2010.01)
*G01S 5/06* (2006.01)
(Continued)

(52) U.S. Cl.
CPC .............. *G01S 5/0289* (2013.01); *G01S 5/06* (2013.01); *B60N 2/002* (2013.01); *B60N 2/0021* (2023.08);
(Continued)

(58) Field of Classification Search
CPC . G01S 5/0289; G01S 5/14; G01S 5/06; G01S 5/04; G01S 5/021; G01S 5/0252;
(Continued)

(56) References Cited

U.S. PATENT DOCUMENTS 9,055,407 B1    6/2015 Riemer
9,654,932 B1 *  5/2017 Mukhtar ............... H04W 4/027
(Continued)

FOREIGN PATENT DOCUMENTS

CA    3016599    9/2017
CN    202313288    7/2012
(Continued)

OTHER PUBLICATIONS

Cheng et al; You're Driving and Texting: detecting drivers using personal smart phones by leveraging inertial sensors; Sep. 13, 2013 (Year 2013).

*Primary Examiner* — Chuong P Nguyen
(74) *Attorney, Agent, or Firm* — PEARL COHEN ZEDEK LATZER BARATZ LLP

(57) ABSTRACT

A system and method for classifying a mode of operation of a mobile communication device within a defined volume, based on multiple sensors are provided herein. The method may include the following steps: determining a position of the mobile communication device relative to a frame of reference of the defined volume, based on any of: angle of arrival, time of flight, or received intensity of radio frequency (RF) signals transmitted by the mobile communication device and received by a phone location unit located within the defined volume configured to wirelessly communicate with the at least one mobile communication device; obtaining at least one sensor measurement related to the mobile communication device from various non-RF sensors; and using a computer processor to classify the mobile communication device into one of many predefined modes (Continued)

of operation of the mobile communication device, based on the position and the sensor readings.

16 Claims, 5 Drawing Sheets

(51) Int. Cl.
 *B60N 2/00*   (2006.01)
 *B60W 40/08*  (2012.01)
 *B60W 40/09*  (2012.01)
 *B60W 40/13*  (2012.01)
 *G01S 13/58*  (2006.01)
 *G01S 13/931*  (2020.01)

(52) U.S. Cl.
 CPC ............ *B60N 2/0024* (2023.08); *B60N 2/003* (2023.08); *B60N 2/0035* (2023.08); *B60N 2210/40* (2023.08); *B60N 2230/20* (2023.08); *B60N 2230/30* (2023.08); *B60W 2040/0881* (2013.01); *B60W 40/09* (2013.01); *B60W 40/13* (2013.01); *B60W 2040/1353* (2013.01); *B60W 2540/01* (2020.02); *B60W 2540/221* (2020.02); *B60W 2540/227* (2020.02); *B60W 2540/229* (2020.02); *G01S 5/021* (2013.01); *G01S 13/589* (2013.01); *G01S 13/931* (2013.01); *G01S 2013/932* (2020.01); *G01S 2013/9322* (2020.01)

(58) Field of Classification Search
 CPC .... G01S 13/589; G01S 13/765; G01S 13/931; G01S 2013/932; G01S 2013/9322; B60W 40/09; B60W 40/13; B60W 2540/227; B60W 2540/01; B60W 2540/221; B60W 2040/0863; B60W 2040/0872; B60W 2540/0881; B60W 2040/1353
 USPC .................................................. 342/463, 450
 See application file for complete search history.

(56) References Cited

U.S. PATENT DOCUMENTS

| | | | | |
|---|---|---|---|---|
| 9,681,361 | B2 * | 6/2017 | Tuluca | G07C 5/008 |
| 9,714,037 | B2 * | 7/2017 | DeRuyck | G06V 20/597 |
| 9,749,866 | B2 * | 8/2017 | Caldwell | H04W 4/027 |
| 9,854,086 | B1 * | 12/2017 | McSchooler | H04W 4/48 |
| 10,075,581 | B2 * | 9/2018 | Cohen | H04W 4/027 |
| 10,158,977 | B2 * | 12/2018 | Cordova | H04L 67/535 |
| 10,278,039 | B1 * | 4/2019 | Matus | H04W 4/029 |
| 10,412,212 | B2 * | 9/2019 | Cohen | H04W 4/50 |
| 10,447,846 | B2 * | 10/2019 | Moir | H04W 4/025 |
| 10,557,917 | B2 | 2/2020 | Shoshan et al. | |
| 10,785,604 | B1 * | 9/2020 | Kumar | G06Q 10/0639 |
| 10,872,618 | B2 * | 12/2020 | Phan Le | H04W 4/027 |
| 11,038,801 | B2 * | 6/2021 | McKeefery | H04B 17/27 |
| 11,107,175 | B2 * | 8/2021 | Zilberman | G06N 20/00 |
| 11,122,159 | B1 * | 9/2021 | Alsolami | H04M 1/72463 |
| 11,338,733 | B2 * | 5/2022 | Cordova | G06N 20/00 |
| 12,174,309 | B2 * | 12/2024 | Meidan | G01S 13/589 |
| 12,231,899 | B2 * | 2/2025 | Meidan | H04W 4/027 |
| 2014/0187219 | A1 | 7/2014 | Yang | |
| 2016/0046298 | A1 | 2/2016 | DeRuyck | |
| 2016/0205238 | A1 | 7/2016 | Abramson et al. | |
| 2017/0105098 | A1 | 4/2017 | Cordova | |
| 2017/0150360 | A1 * | 5/2017 | Caldwell | H04W 4/023 |
| 2017/0244831 | A1 * | 8/2017 | Tuluca | H04W 48/04 |
| 2018/0093672 | A1 | 4/2018 | Terwilliger | |
| 2019/0387365 | A1 * | 12/2019 | Spruyt | H04W 4/029 |
| 2020/0223358 | A1 | 7/2020 | Cordova | |
| 2020/0252339 | A1 | 8/2020 | McKeefery | |
| 2021/0004414 | A1 | 1/2021 | Silverstein | |
| 2022/0032924 | A1 * | 2/2022 | Jeihani | B60W 40/09 |
| 2023/0023156 | A1 * | 1/2023 | Meidan | G01S 5/04 |
| 2023/0027582 | A1 * | 1/2023 | Meidan | B60R 21/01516 |
| 2023/0185942 | A1 | 6/2023 | Hanebeck | |

FOREIGN PATENT DOCUMENTS

| | | | |
|---|---|---|---|
| CN | 108921418 | 11/2018 | |
| EP | 2939133 | 10/2018 | |
| EP | 3343306 | 8/2019 | |
| WO | WO-2023161922 A1 * | 8/2023 | ............ B60W 40/09 |

* cited by examiner

SYSTEM AND METHOD FOR CLASSIFYING A MODE OF OPERATION OF A MOBILE COMMUNICATION DEVICE IN A VOLUME BASED ON SENSOR FUSION

CROSS-REFERENCE TO RELATED APPLICATIONS

This application claims the benefit of and priority to U.S. Provisional Patent Application No. 63/223,980, filed on Jul. 21, 2021, which is incorporated herein by reference in its entirety.

FIELD OF THE INVENTION

The present invention relates generally to the field of signal processing, and more particularly to using sensor fusion to classify signals of various types concerning a mobile communication device.

BACKGROUND OF THE INVENTION

Automatically locating a mobile communication device within a defined volume is known in the art and has many applications. One known application refers to determining whether a mobile communication device is being used by a driver of a moving vehicle. Such a solution is described in U.S. Pat. No. 10,075,581 which is incorporated herein by reference in its entirety. Further improvements to the localization of a mobile communication device within a defined volume have been described in U.S. Pat. No. 10,557,917 which is also incorporated herein by reference in its entirety.

As mobile communication devices have several modes of operation as described hereinafter, it would be further advantageous to know, in addition to the location of the mobile communication device, also its mode of operation, in order to determine the overall driving safety.

SUMMARY OF THE INVENTION

In order to address the aforementioned challenges, it has been suggested by the inventors of the present invention to introduce a sensor fusion approach to the aforementioned classification problem. In addition to the localization data received using known technologies, the plurality of sensors, internal to the mobile communication device or external to it, are used together to deduce the mode of operation of the mobile communication device.

According to some embodiments, the mode of operation classification further includes information about a person interacting with the mobile communication device. For example, there is a significant difference if a mobile communication device in texting mode is interacting with a bus driver, or a passenger seated in a back seat.

Some embodiments of the present invention provide a system and a method for classifying the mode of operation of at least one mobile communication device within a defined volume, based on multiple sensors are provided herein. The method may include the following steps: determining a position of the at least one mobile communication device relative to a frame of reference of the defined volume, based on at least one of: angle of arrival, time of flight such as Round Trip Time (RTT) and Time Difference Of Arrival (TDOA), or received intensity of radio frequency (RF) signals transmitted by the at least one mobile communication device and received by a phone location unit located within the defined volume and comprising a transceiver and antennas and further configured to wirelessly communicate with the at least one mobile communication device; obtaining at least one sensor measurement related to the at least one mobile communication device, from a sensor located on at least one of: the at least one mobile communication device, within the defined volume, or outside of the defined volume; and using a computer processor to classify the at least one mobile communication device into at least one of a plurality of predefined modes of operation of the mobile communication device, based on the position and the at least one sensor reading.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
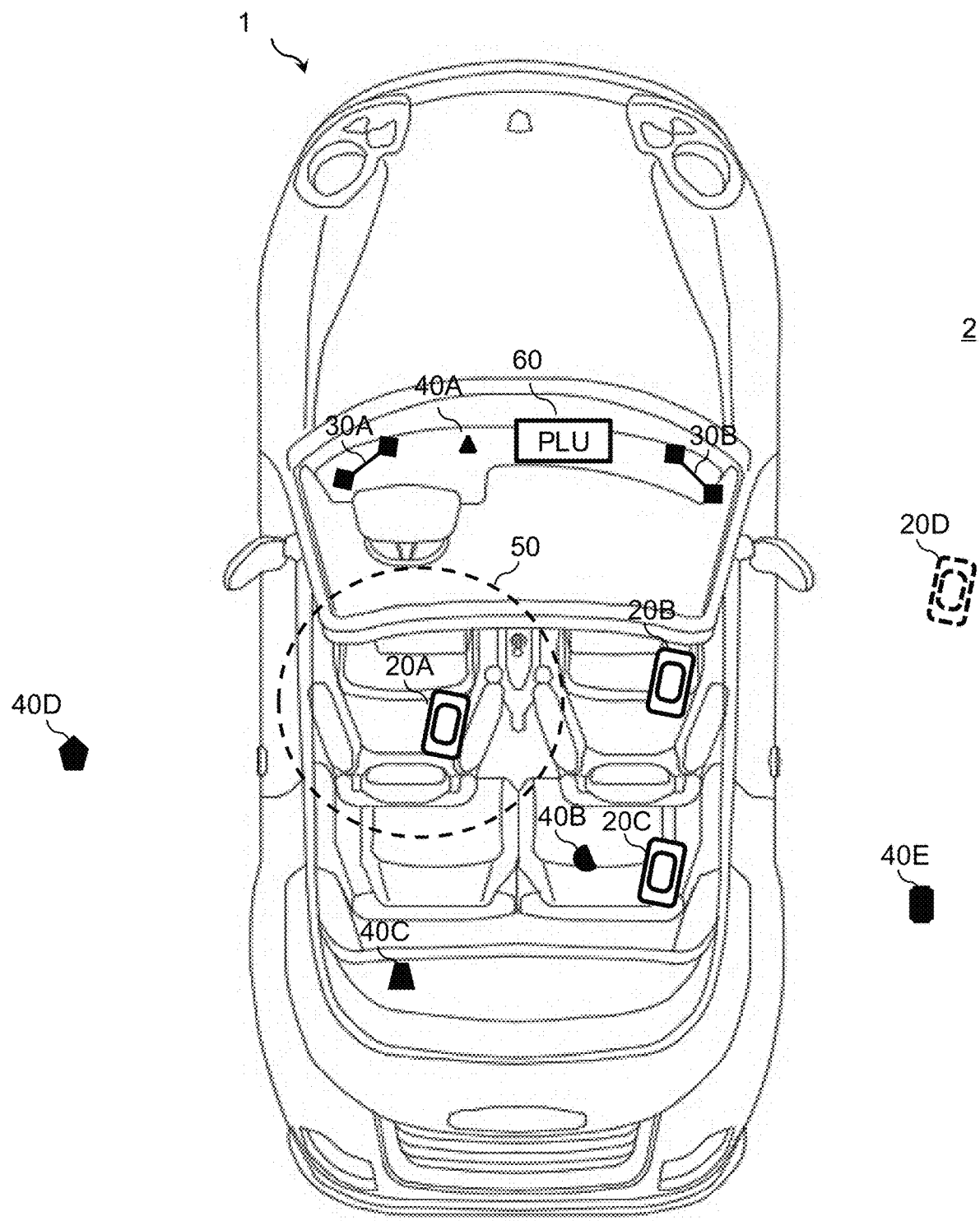
FIG. 1 is a high-level block diagram illustrating a deployment of the system in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Prior to setting forth the detailed description of the invention, it may be helpful to provide herein definitions of certain terms that will be used hereinafter.

The terms "volume", "defined volume" or "closed volume" as used herein are defined as any well-defined volume with boundaries that can be set or detected. The volume is typically a vehicle such as a car, train, airplane, ship, but can also be a motorbike or any other moving platform. The volume can also relate to a room such as a conference room, a theater, and the like. The defined volume herein is in contrast with an open space whose boundaries cannot be easily defined.

The term "mobile communication device" as used herein is defined as any electronic device which is small enough to be carried by a human user and further has radio frequency (RF) wireless communication capabilities. The mobile communication device is typically a phone such as a smartphone, a smartwatch, a laptop, a tablet, or a game console. The mobile communication device may support audio calls or transmitting and receiving data and may or not have a touch screen.

The term "phone location unit" or PLU as used herein is defined as a hardware-based device typically including a set of RF receiving antennas placed in a known location within the defined volume, a receiver, and a computer processor. The PLU can locate a mobile communication device based on processing the RF signals received by its antennas.

The term "mode of operation" as used herein is defined as the mode of operation of the mobile communication device and may relate to the functionalities that are being carried out in a specific instant of time. Some modes of operation are listed herein by means of a non-exhaustive list: An "idle" mode is defined where the mobile communication device is turned on but does not have any application running in the foreground and does not have any of its I/O functionalities in an operative mode. A "calling" mode is defined whenever an audio call of any type is taking place which requires the use of a microphone, speaker, headphones. A "messaging" mode is defined as any use of an instant messaging application for sending an SMS, MMS, or any other type of instant message, including the use of any email application. A mode of "touching" is a mode when the user is using the touch screen in any way by using any of the applications currently in the foreground.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating a system for classifying a mode of operation of at least one mobile communication device 20A-20C within a defined or closed volume, such as car 1, based on multiple sensors 40A, 40B, 40C, 40D, 40E located either within or outside the defined volume or on various mobile communication devices located within or outside the defined volume. A phone location unit (PLU) 60 is located within the defined volume and is configured to determine the position of the at least one mobile communication device 20A-20C relative to a frame of reference of defined volume 1 and specifically allows determining whether any of mobile communication devices 20A-20C are located within an area defined as the driver's canopy 50.

According to some embodiments of the present invention, the localization of the mobile communication device 20A-20C by PLU 60 may be based on at least one of: angle of arrival (e.g., using directional antennas, monopulse antennas, antenna arrays, etc.), time of flight (e.g., using UWB round trip time measurements), or received intensity of radio frequency (RF) signals transmitted by the at least one mobile communication device 20A-20C and received by the PLU 60 which may include a transceiver (not shown) and at least two pairs of antennas 30A, 30B and further configured to wirelessly communicate with the at least one mobile communication device 20A-20C.

According to some embodiments of the present invention, the system may include a plurality of sensors 40A, 40B, 40C which are either installed as part of car 1 or can be retrofitted once the system is installed on car 1. The system may be configured to obtain at least one sensor measurement, possibly via a wireless communication with PLU 60, such measurements being related to the at least one mobile communication device 20A-20C. These sensors may be located on at least one of: the at least one mobile communication device 20A-20C, within the defined volume 1, for example, sensors 40A, 40B, 40C, or outside 2 of the defined volume, for example, sensors 40D and 40E which can be sensors on mobile communication devices in other vehicles which are sufficiently close to the system and can communicate with it. In some embodiments, sensors 40D and 40E may be imaging sensors which are installed outside the vehicle, and which may provide information related to the mode of operation.

According to some embodiments, the defined volume 1 is any type of vehicle such as a car, train, airplane, ship, but can also be a motorbike or any other moving platform. According to some embodiments of the present invention, the system may further include a computer processor, or a computing device (not shown here) configured to classify the at least one mobile communication device 20A-20C into at least one of a plurality of predefined modes of operation of the mobile communication device, based on the calculated position and the at least one sensor reading.

According to some embodiments of the present invention, the classification by the computer processor is carried out by assigning to the at least one mobile communication device a respective likelihood, to at least one mode of operation selected from a plurality of modes of operation.

According to some embodiments of the present invention, the system may obtain readings from at least two inertial measurement units (IMU) wherein at least one of the IMUs is located on the at least one mobile communication device 20A-20C and at least one of the IMUs is located anywhere within the car such as on a vehicle IMU 40A or alternatively an IMU of PLU 60. The inertial sensors readings may be subtracted to yield a differential measurement which can be used to deduce internal movement of the at least one mobile communication device 20A-20C within the vehicle 1.

According to some embodiments of the present invention, the position of the mobile communication unit within the defined volume is further determined to be in the vehicle's driver area, wherein the obtaining at least one sensor measurement related to the at least one mobile communication device is from a motion sensor 40A, said sensor providing information related to the vehicle's speed and wherein the vehicle's speed is factored in classifying the likelihood of the mode of operation, wherein for a mobile communication device located in the driver's area referred to as driver's canopy 50, a higher speed infers a higher probability of an idle mode of operation or a mode of operation not involving the manual intervention of the user (e.g., texting).

In other cases, and according to some embodiments, the mobile communication device 20A-20C may be located in the back seat area, and that infers a lower probability of a phone call using a fixed cradle. A mobile communication device 20A-20C on a fixed cradle (not shown) may be identified by correlating measurements from an inertial sensor in the mobile device 20C and measurements from an inertial sensor in the vehicle 40A and/or the phone location unit 60.

According to some embodiments of the present invention, inside the vehicle there is at least one person, and wherein the obtaining at least one sensor measurement related to the at least one mobile communication device is from a proximity sensor, said proximity sensor providing information on the proximity between the at least one mobile communication device and the at least one person, and wherein the proximity is factored in classifying the likelihood of the mode of operation, wherein a closer proximity infers a higher probability of an on-call mode of operation.

As may be apparent to one skilled in the art, the estimated location of the mobile communication device in the vehicle may affect the likelihood of one or more modes of operation. For example, the combination of the proximity sensor and a location far from the driver's area may infer that a phone call is being performed by a vehicle's passenger.

According to some embodiments of the present invention, inside the vehicle there is at least one person, and wherein the vehicle comprises at least one seat with a pressure sensor 40B indicating that said seat is occupied by the at least one person, and wherein the obtaining at least one sensor measurement related to the at least one mobile communication device is from a seat pressure sensor and wherein the seat pressure sensor indication is factored in classifying the likelihood of the mode of operation, wherein a positive indication of a seat pressure sensor infers a higher probability of a use of a mobile communication device by a person occupying that seat.

According to some embodiments, the estimated location of the mobile communication unit is further combined with measurements from several sensor types. For example, seat pressure sensors indicating seat occupancy in both the driver's seat and a back seat in a car, together with an indication of proximity between the mobile communication device and a person and an estimated location in the front seats, may significantly increase the probability of a phone call being performed by a driver with a unit on-hand. According to some embodiments, the likelihood of this mode of operation can be further increased (or decreased) by using measurements from inertial sensors as previously disclosed.

According to some embodiments of the present invention, inside the vehicle there is at least one person, and wherein the at least one person is sensed by at least one vital signs sensor, and wherein the obtaining at least one sensor measurement related to the at least one mobile communication device is from at least one vital signs sensor and wherein a vital signs measurement is factored in classifying the likelihood of the mode of operation, wherein a level of vital signs outside (i.e., above or below) a certain threshold or limit infers a higher probability of a non-idle mode of operation of the at least one mobile communication device. For example, and according to some embodiments, vital signs measurements which may include heart rate, heart rate variability. For example, the standard deviation of all normal-to-normal R-R intervals-SDNN and root mean square of successive differences between normal-to-normal R-R intervals— (rMSSD data), blood pressure, respiration rate and pulse-respiration quotient (PRQ), sympathetic stress, parasympathetic activity, etc. may help in detecting some activities related to mobile phone usage such texting while driving, the distraction of the user (e.g., driver), etc.

According to some embodiments, the phone location unit may keep the history of measurements related to the driver's vital signs (e.g., average heart rate and heart rate variability) and may correlate them with new measurements. According to some embodiments, this correlation may allow better identification of the driver and increase the probability of operating modes related to the driver. When combined with measurements from other sensors (e.g., seat sensors), and the mobile communication unit location, special operating modes may be detected (e.g., a driver's distress mode using his phone to request assistance).

Figure 2A:
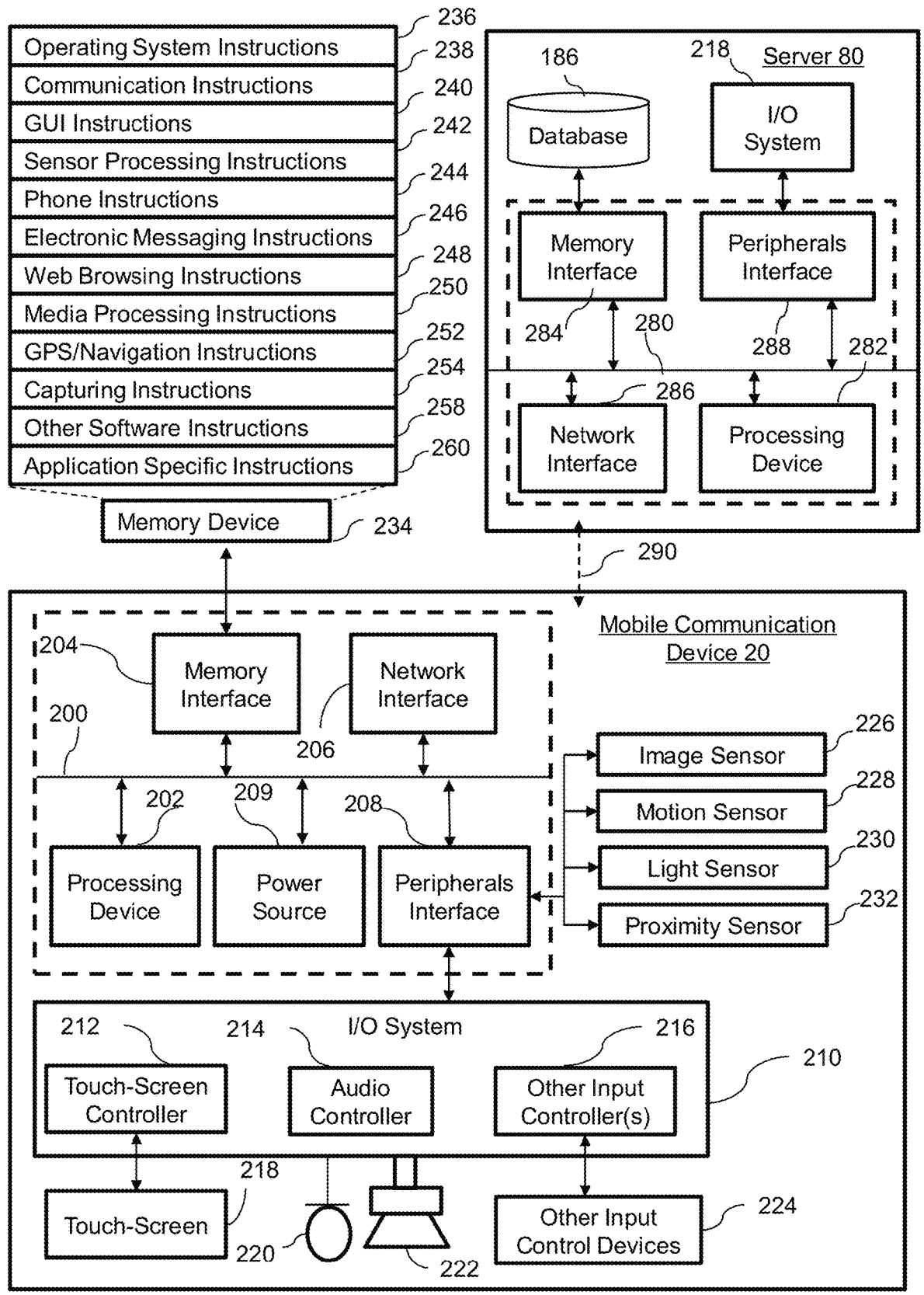
FIG. 2A is a detailed block diagram illustrating an exemplary architecture of a mobile communication device in communication with a server in accordance with some embodiments of the present invention.

FIG. 2A shows an exemplary block diagram of the configuration of a server 80 and a mobile communication device 20. According to some embodiments of the present invention, a server 80 for classifying a mode of operation of at least one mobile communication device 20 within a defined volume, based on the mobile communication device position and at least one sensor, is illustrated herein.

In one embodiment, server 80, directly or indirectly, may access a bus 280 (or another data transfer mechanism) that interconnects subsystems and components for transferring information within the server 80. For example, 280 may interconnect a processing device 282, a memory interface 284, a network interface 286, a peripherals interface 288 connected to I/O system 218. The server 80 may comprise a power source (not shown).

Server 80 may include a network interface 266 configured to receive, from a phone location unit 60 (not shown in FIG. 2A), the position of the at least one mobile communication device 20 relative to a frame of reference of the defined volume, based on at least one of: angle of arrival, time of flight, or received intensity of radio frequency (RF) signals transmitted by the at least one mobile communication device and received by the phone location unit located within the defined volume and comprising a transceiver and antennas and further configured to wirelessly communicate with the at least one mobile communication device.

Server 80 may further include an interface 284 to a memory configured to store at least one sensor measurement related to the at least one mobile communication device, from a sensor located on at least one of: the at least one mobile communication device, the phone location unit, within the defined volume, or outside of the defined volume.

The server 80 may further include a processing device 282 configured to classify the at least one mobile communication device 20 into at least one of a plurality of pre-defined modes of operation of the mobile communication device, based on the position and at least one sensor reading.

Processing device 282 may include at least one processor configured to execute computer programs, applications, methods, processes, or other software to perform embodiments described in the present disclosure. For example, the processing device may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The processing device may include at least one processor configured to perform functions of the disclosed methods. The processing device may include a single-core or multiple core processors executing parallel processes simultaneously. In one example, the processing device may be a single-core processor configured with virtual processing technologies. The processing device may be implemented using a virtual machine architecture or other methods that provide the ability to execute, control, run, manipulate, store, etc., multiple software processes, applications, programs, etc. In another example, the processing device may include a multiple-core processor architecture (e.g., dual, quad-core, etc.) configured to provide parallel processing functionalities to allow a device associated with the processing device to execute multiple processes simultaneously. It is appreciated that other types of processor architectures could be implemented to provide the capabilities disclosed herein.

In some embodiments, processing device 282 may use a memory interface 284 to access data and a software product stored on a memory device or a non-transitory computer-readable medium or to access a data structure 186. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within the server 80, or at a remote location. Additionally, one or more computer-readable storage mediums can be utilized in implementing a computer-implemented method. The term "computer-readable storage medium" should be understood to include tangible items and exclude carrier waves and transient signals.

According to some embodiments, the network interface 286 may provide two-way data communication to a network. In FIG. 2a, the communication 290 between the mobile communication device 20 and server 80 is represented by a dashed arrow. In one embodiment, the network interface 286 may include an integrated services digital network (ISDN) card, cellular modem, satellite modem, or a modem to provide a data communication connection over the Internet. As another example, the network interface 286 may include a wireless local area network (WLAN) card. In another embodiment, the network interface 286 may include an Ethernet port connected to radio frequency receivers and transmitters. The specific design and implementation of the network interface 286 may depend on the communications network(s) over which the mobile communication device 20 and the server 80 may communicate.

According to some embodiments, the server 80 may also include a peripherals interface 288 coupled to the bus 280. The peripherals interface 288 may also be connected to devices, and subsystems to facilitate multiple functionalities as performed by the server 80. In some embodiments, those devices and subsystems may comprise a display screen (e.g., CRT or LCD) a USB port, and the like.

With regard to the mobile communication device 20, and according to some embodiments, the mobile communication device 20, directly or indirectly, may access a bus 200 (or another data transfer mechanism) that interconnects subsystems and components for transferring information within the mobile communication device 20. For example, bus 200 may interconnect a processing device 202, a memory interface 204, a network interface 206, a peripherals interface 208 connected to I/O system 210. A power source 209 provides the power to the mobile communication device and it may include a primary or a rechargeable battery (not shown), DC-DC converters (not shown) and other components required for the proper operation of the device 20.

Processing device 202 may include at least one processor configured to execute computer programs, applications, methods, processes, or other software to perform embodiments described in the present disclosure. For example, the processing device 202 may include one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The processing device 202 may include at least one processor configured to perform functions of the disclosed methods. The processing device may include a single-core or multiple core processors executing parallel processes simultaneously. In one example, the processing device may be a single-core processor configured with virtual processing technologies. The processing device may be implemented using a virtual machine architecture or other methods that provide the ability to execute, control, run, manipulate, store, etc., multiple software processes, applications, programs, etc. In another example, the processing device may include a multiple-core processor architecture (e.g., dual, quad-core, etc.) configured to provide parallel processing functionalities to allow a device associated with the processing device to execute multiple processes simultaneously. It is appreciated that other types of processor architectures could be implemented to provide the capabilities disclosed herein.

In some embodiments, processing device 202 may use a memory interface 204 to access data and a software product stored on a memory device or a non-transitory computer-readable medium. For example, processing device 202 may use a memory interface 204 to access a memory device 234. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, any other optical data storage medium, a PROM, an EPROM, a FLASH-EPROM or any other flash memory, NVRAM, a cache, a register, any other memory chip or cartridge, and networked versions of the same. The terms "memory" and "computer-readable storage medium" may refer to multiple structures, such as a plurality of memories or computer-readable storage mediums located within mobile communication device 20 or at a remote location. Additionally, one or more computer-readable storage mediums can be utilized in implementing a computer-implemented method. The term "computer-readable storage medium" should be understood to include tangible items and exclude carrier waves and transient signals.

According to some embodiments, the network interface 206 may provide two-way data communication to a wireless network. In one embodiment, the network interface 206 may include an integrated services digital network (ISDN) card or module, cellular modem, satellite modem, or a modem to provide a data communication connection over the Internet. As another example, the network interface 206 may include a wireless local area network (WLAN) card or module. For example, in some embodiments, the network interface 206 is designed to operate over a Wi-Fi or Bluetooth® networks. In another embodiment, the network interface 206 may include an Ethernet port connected to radio frequency receivers and transmitters and in some embodiments also connected to optical (e.g., infrared) receivers and transmitters. The specific design and implementation of the network interface 206 may depend on the communications network(s) over which the mobile communication device 20 is intended to operate. In any such implementation, the network interface 206 may be configured to send and receive electrical, electromagnetic, or optical signals that carry digital data streams representing various types of information.

According to some embodiments, the peripherals interface 208 may also be connected to sensors, devices, and subsystems to facilitate multiple functionalities. In one embodiment, the peripherals interface 208 may be connected to an I/O system 210 configured to receive signals or input from devices and to provide signals or output to one or more devices that allow data to be received and/or transmitted by the mobile communication device 20. In one example, the I/O system 210 may include a touch screen controller 212, audio controller 214, and/or other types of input controller(s) 216. The touch screen controller 212 may be coupled to a touch screen 218. The touch screen 218 and the touch screen controller 212 may, for example, detect contact, movement, using any of a plurality of touch sensitivity technologies, including but not limited to capacitive, resistive, infrared, and surface acoustic wave technologies as well as other proximity sensor arrays or other elements for determining one or more points of contact with the touch screen 218. The touch screen 218 may also, for example, be used to implement virtual or soft buttons and/or a keyboard. While a touch screen 218 is shown in FIG. 2a, I/O system 210 may include a display screen (e.g., LCD or LED) in place of a touch screen 218. The audio controller 214 may be coupled to a microphone 220 and to a speaker 222 to facilitate voice-enabled functions, such as voice recognition, voice replication, digital recording, and telephony functions. The other input controller(s) 216 may be coupled to other input/control devices 224, such as one or more buttons, rocker switches, thumbwheel, infrared port, USB port, and/or a pointer device such as a stylus.

According to some embodiments, the peripherals interface 208 may also be connected to an image sensor 226, a motion sensor 228, a light sensor 230, and/or a proximity sensor 232 to facilitate image capturing, orientation, lighting, and proximity functions. Other sensors (not shown) may also be connected to the peripherals interface 208, such as a temperature sensor, a biometric sensor, or other sensing devices that facilitate related functionalities. In addition, a GPS receiver may also be integrated with, or connected to, the mobile communication device 20, such as GPS receivers typically integrated into mobile communications devices. Alternatively, GPS software may permit the mobile communication device 20 to access an external GPS receiver (e.g., connecting via a serial port or Bluetooth).

Consistent with the present disclosure, the mobile communication device 20 may use a memory interface 204 to access a memory device 234. The memory device 234 may include high-speed random-access memory and/or non-volatile memory such as one or more magnetic disk storage devices, one or more optical storage devices, and/or flash memory (e.g., NAND, NOR). The memory device 234 may store an operating system 236, such as Android, iOS, MS Windows, Linux, or any other embedded operating system. The operating system 236 may include instructions for handling basic system services and for performing hardware-dependent tasks. In some implementations, the operating system 236 may be a kernel (e.g., Linux kernel).

The memory device 234 may also store communication instructions 238 to facilitate communicating with one or more additional devices, one or more computers, and/or one or more servers. The memory device 234 may include: graphical user interface instructions 240 to facilitate graphic user interface processing; sensor processing instructions 242 to facilitate sensor-related processing and functions; phone instructions 244 to facilitate phone-related processes and functions; electronic messaging instructions 246 to facilitate electronic-messaging related processes and functions; web browsing instructions 248 to facilitate web browsing-related processes and functions; media processing instructions 250 to facilitate media processing-related processes and functions; GPS/navigation instructions 252 to facilitate GPS and navigation-related processes and instructions; capturing instructions 254 to facilitate processes and functions related to image sensor 226; and/or other software instructions 258 to facilitate other processes and functions.

Each of the above-identified instructions and applications may correspond to a set of instructions for performing one or more functions described above. These instructions do not necessarily need to be implemented as separate software programs, procedures, or modules. The memory device 234 may include additional instructions or fewer instructions. Furthermore, various functions of the mobile communication device 20 may be implemented in hardware and/or in software, including in one or more signal processing and/or application-specific integrated circuits.

The components and arrangements shown in FIG. 2a for both the server 80 and the mobile communication device 20 are not intended to limit the disclosed embodiments. As will be appreciated by a person skilled in the art having the benefit of this disclosure, numerous variations and/or modifications may be made to the depicted configuration of the server 80. For example, not all the depicted components may be essential for the operation of server 80 in all cases. Any component may be located in any appropriate part of the server 80, and the components may be rearranged into a variety of configurations while providing the functionality of the disclosed embodiments. For example, some servers may not include all the elements in I/O system 218. Similarly, not all the depicted components may be essential for the operation of the mobile communication device 20 in all cases. For example, some types of mobile communication devices may include only part of the depicted sensors and include sensors which are not depicted.

Figure 2B:
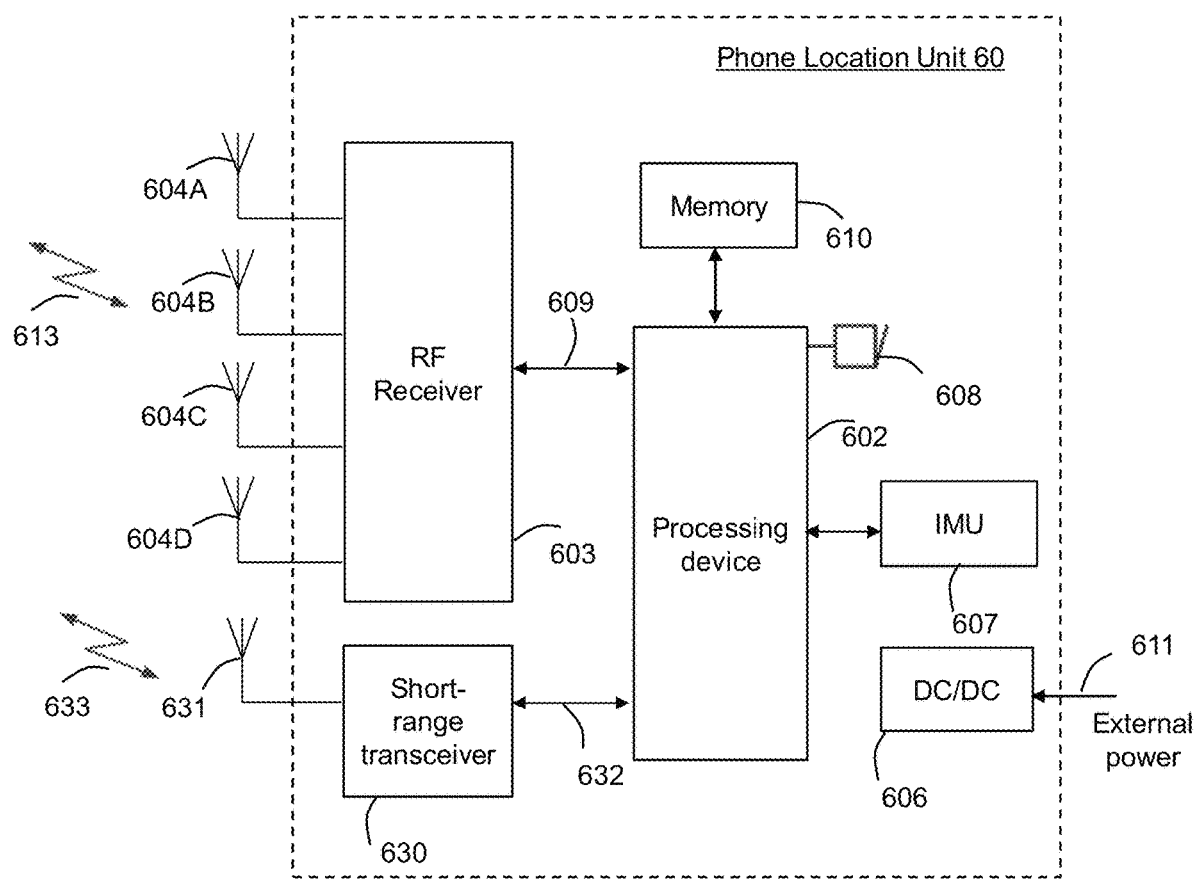
FIG. 2B is a detailed block diagram illustrating an exemplary architecture of a phone location unit in accordance with some embodiments of the present invention.

Referring now to FIG. 2b, the block diagram of an exemplary phone location unit 60 is depicted.

In one embodiment, Phone Location Unit 60 may comprise a processing unit 602 which may control the Phone Location Unit 60, at least one RF receiver 603 coupled 609 to the processing unit 602 and coupled to a plurality of antennas 604A-604D, an inertial measurement unit (IMU) 607 such as an accelerometer, magnetometer or, gyroscope, a buzzer 608 for providing audio notifications, and a DC/DC converter 606 that may provide the required power to each of the Phone Location Unit 60 functions. The coupling 609 between the at least one RF receiver 603 and processing unit 602 may consist of a digital data bus, comprising sampled data from an Analog-to-Digital component (not shown) in the receiver 603. The A/D samples may be processed by the processing unit 602 to detect and locate the source of the received signals 613.

According to some embodiments, the processing unit 602 may also interface with a memory 610. The memory device 610 may include high-speed random-access memory and/or non-volatile memory such as one or more magnetic disk storage devices, one or more optical storage devices, and/or flash memory (e.g., NAND, NOR). The memory device 610 may store an operating system, such as Android, iOS, MS Windows, Linux, or any other embedded operating system. The operating system may include instructions for handling basic system services and for performing hardware-dependent tasks. In some implementations, the operating system may be a kernel (e.g., Linux kernel).

The memory device 610 may also store communication instructions to facilitate communicating with one or more additional devices, one or more computers, and/or one or more servers. The memory device 610 may include: graphical user interface instructions to facilitate graphic user interface processing; sensor processing instructions to facilitate sensor-related processing and functions; signal processing instructions to facilitate signal processing algorithms and functions; electronic messaging instructions to facilitate electronic-messaging related processes and functions; web browsing instructions to facilitate web browsing-related processes and functions; media processing instructions to facilitate media processing-related processes and functions; GPS/navigation instructions to facilitate GPS and navigation-related processes and instructions; and/or other software instructions to facilitate other processes and functions.

In one embodiment, the Analog-to-Digital (A/D) component is part of the RF receiver unit 603 wherein analog signals are provided by the RF receiver 603 through the coupling 609. In one embodiment each coupling 609 may use a plurality of lanes (e.g., 2 lanes) in order to reduce the data rate at every single lane.

In some embodiments, the DC/DC converter may also be connected 611 to an external power source. According to one embodiment, the external power source is a vehicle's battery.

In one embodiment, a mobile communication device 20 (not shown) within a defined volume (e.g., vehicle's cabin) in which the antennas 604A-604D are deployed and operative to receive wireless signals 613 transmitted by the mobile communication device 20, may be located in a predetermined area (e.g., driver's seat area) inside the defined volume.

According to one embodiment, the antennas 604A-604D may be installed in different places in the volume in order to create space diversity to the wireless signals 613 transmitted within the volume. The places in which those antennas 604A-604D are installed may have a significant influence on the phone location unit 60 performance and to its ability to locate a mobile communication device 20 in a predetermined area (e.g., driver's seat area or passenger's area). According to one embodiment, the placement of the antennas 604A-604D may be optimized to locate mobile communication devices 60 in the driver's seat area.

According to one embodiment, the Phone Location Unit 60 may further comprise an embedded short-range wireless link (e.g., an IEEE802.11a/b/g/n/ac/ad WLAN and/or BT/BLE transceiver) 630. The short-range transceiver 630 may comprise an antenna (internal or external) 631 and may be connected 632 to the processing unit 602. In one embodiment, the short-range transceiver 630 may communicate 633 with a mobile communication device in communication range. According to one embodiment, the short-range communication 633 may be performed through an IEEE802.11a/b/g/n/ac/ad Access Point, hub, gateway or the like (not shown).

In one embodiment, the at least one RF receiver 603 may be programmed to receive signals in the frequency band of the wireless signals 613 transmitted by the mobile communication device 20. According to one embodiment, the RF receiver 603 may be connected one at a time to each of the antennas 604A-604D. This connection may be performed by an RF switch (not shown), typically with a low insertion loss and low noise figure. The architecture of the RF receiver 603 may differ among different implementations of the Phone Location Unit 60. In one embodiment, it may comprise a low noise amplifier (LNA), bandpass filters, a synthesizer, a mixer, an IQ demodulator, low pass filters, and analog-to-digital converters. The sampled baseband signals may be transferred 609 to a processing unit 602 to be further processed.

The processing unit 602 may the collection process until enough signal samples from each of the antennas 604A-604D are collected in order to estimate the location of the mobile communication device 20 in the volume.

According to one embodiment of the present invention, the Phone Location Unit 60 may utilize one of the following methods or any combination of them, to locate the position of the mobile communication device 20 in a defined volume and/or detect its presence in a predetermined area:

Received Signal Strength Indicator (RSSI): Using the RSSI at each antenna to estimate the wireless device distance to that antenna and then using triangulation techniques. This method may utilize the ratio of the RSSI at each antenna pair 604A-604D.

Channel fingerprinting: Generating a radio map of the volume comprising RF-parameters signatures at each of the antennas 604A-604D. Then estimating the mobile communication device position by correlating measured values of RF parameters at each antenna to fingerprints values in the radio map. Fingerprinting methods may utilize Power Level (RSSI) based methods and Delay-spread based methods.

Time Differential-Of-Arrival (TDOA): Estimating the position of the mobile communication device 20 by multilateration of hyperbolae. For example, the Phone Location Unit 60 may comprise four antennas and two RF receivers, wherein the two RF receivers are selectively connected to a pair of antennas for a TDOA measurement.

Round-Trip time (RTT): Estimating the position of the mobile communication device 20 by multilateration of circles. For example, the Phone Location Unit 60 may comprise four antennas and one RF transceiver, wherein the RF transceiver is selectively connected to an antenna 604A-604D for an RTT measurement.

Angle-Of-Arrival (AOA)/Direction-Of-Arrival (DOA) technology: Estimating the angle or direction of arrival at each of the antennas of wireless signals 613 transmitted by the mobile communication device and then using this information to locate the device.

The above-described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), IEEE802.11a/b/g/n/ac/ad network, IEEE802.15.4, IEEE802.16 network, general packet radio service (GPRS) network, HiperLAN), and/or other packet-based wireless networks, a wireless network (e.g., RAN, Bluetooth®, code-division multiple access (CDMA) network, time division multiple access (TDMA) network, global system for mobile communications (GSM) network, EDGE, and GPRS), 3G, LTE or 5G, and/or other circuit-based networks.

Figure 3:
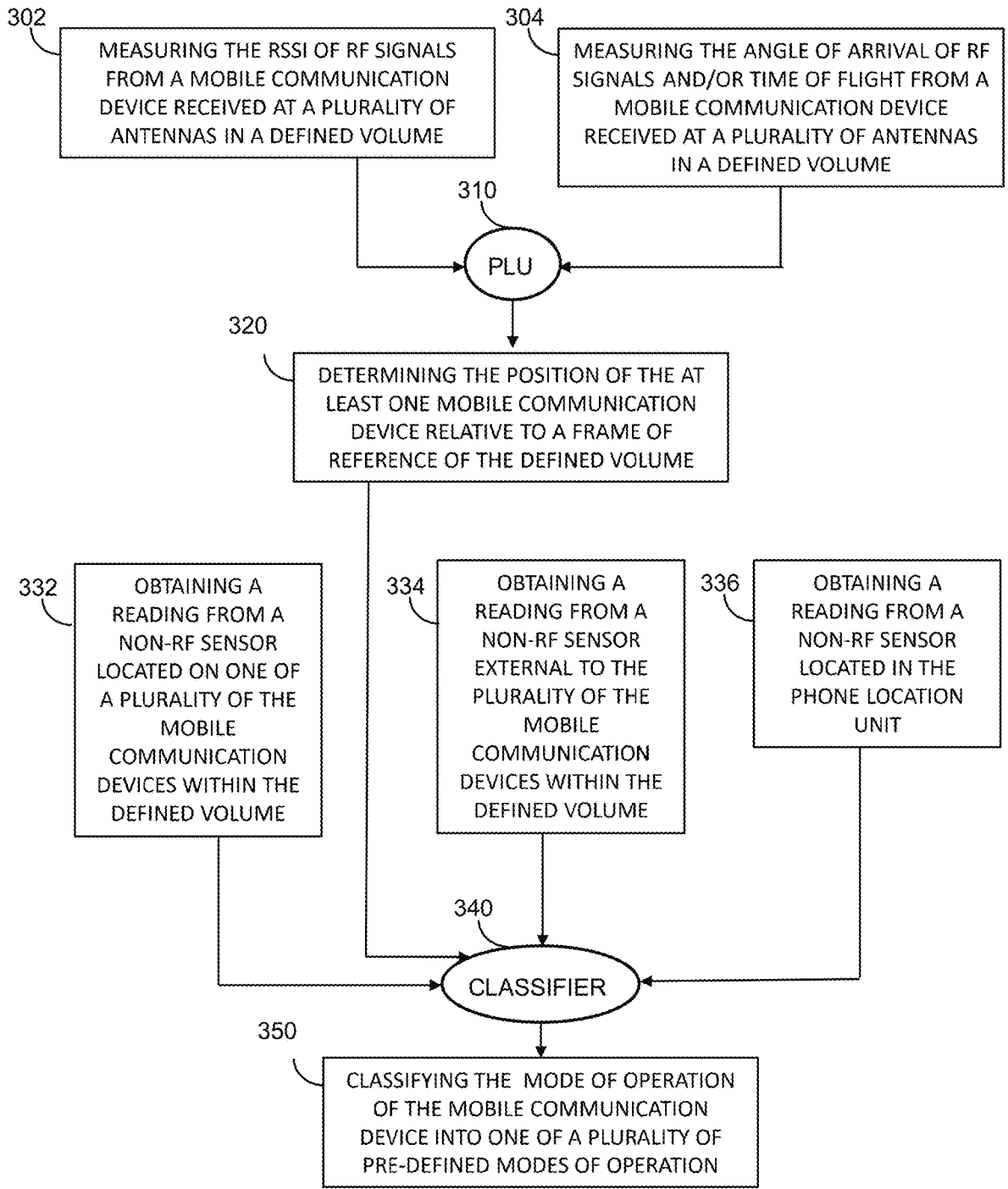
FIG. 3 is a high-level flowchart illustrating a method for classifying modes of operation of a mobile communication device in accordance with embodiments of the present invention.

FIG. 3 is a high-level flowchart illustrating a method for classifying the mode of operation of a mobile communication device in accordance with embodiments of the present invention. Step 302 includes measuring by a PLU, the RSSI of RF signals from a mobile communication device received at a plurality of antennas in a defined volume. Step 304 includes measuring by a PLU, the angle of arrival and/or the time of arrival of RF signals from a mobile communication device received at a plurality of antennas in a defined volume. These steps may occur simultaneously or can be sequential steps. The measurements are processed by a PLU 310 leading to step 320 which includes determining the position of the at least one mobile communication device relative to a frame of reference of the defined volume.

Step 332 may include obtaining the reading from a non-RF sensor located on one of a plurality of the mobile communication devices within the defined volume. Step 334 may include obtaining a reading from a non-RF sensor (i.e., a non-RF sensor does not use RF signals for its sensing operation but can use RF signals to communicate and transfer its measurements to another device) external to the plurality of the mobile communication devices within the defined volume. Step 336 may include obtaining a reading from a non-RF sensor located in the Phone Location Unit. These steps may occur simultaneously or in any order, wherein in some cases, only a subset of them may occur.

Some or all of the readings of the sensors of steps 332, 334, and 336, together with the position as calculated by the PLU at step 320, are fed into a classifier 340, leading to step 350 which includes classifying the mode of operation of the mobile communication device into one of a plurality of predefined modes of operation.

According to some embodiments of the present invention, the classification by the classifier is carried out by assigning to the at least one mobile communication device a respective probability to at least one mode of operation selected from a plurality of modes of operation. According to some embodiments, the classification algorithm may assign a probability to a plurality of predefined modes of operation and then select the one that has the highest probability. According to some embodiments, this classification may involve history measurements and classifications, user's behavior, and other parameters.

According to some embodiments of the present invention, the modes of operation comprise at least one of: idle, on-call, sending a text message, audio input, touch screen in use, and streaming data. According to some embodiments, the mode of operation classification further includes information about a person interacting with the mobile communication device. For example, there is a significant difference if a mobile communication device in texting mode is interacting with a bus driver, or a passenger seated in a back seat.

According to some embodiments of the present invention, the obtaining at least one sensor measurement related to the at least one mobile communication device is from a motion sensor, said sensor providing information related to the vehicle's speed and wherein the vehicle's speed is factored in classifying the likelihood of the mode of operation, wherein for a mobile communication device located in the driver's area, a higher speed infers a higher probability of idle mode of operation or a mode of operation not involving the manual intervention of the user.

According to some embodiments of the present invention, inside the vehicle there is at least one person, and wherein the obtaining at least one sensor measurement related to the at least one mobile communication device is from a proximity sensor, said proximity sensor providing information on the proximity between the at least one mobile communication device and the at least one person, and wherein the proximity is factored in classifying the likelihood of the mode of operation, wherein a closer proximity infers a higher probability of an on-call mode of operation.

According to some embodiments of the present invention, inside the vehicle, there is at least one person, and wherein the vehicle comprises at least one seat with a pressure sensor indicating that said seat is occupied by the at least one person, and wherein the obtaining at least one sensor measurement related to the at least one mobile communication device is from a seat pressure sensor and wherein the seat pressure sensor indication is factored in classifying the likelihood of the mode of operation, wherein a positive indication of a seat pressure sensor infers a higher probability of a use of a mobile communication device by a person occupying that seat.

According to some embodiments of the present invention, inside the vehicle there is at least one person, and wherein the at least one person is sensed by at least one vital signs sensor, and wherein the obtaining at least one sensor measurement related to the at least one mobile communication device is from at least one vital signs sensor and wherein a vital signs measurement is factored in classifying the likelihood of the mode of operation, wherein a level of vital signs outside (e.g., above or below) a certain threshold or limit infers a higher probability of a non-idle mode of operation of the at least one mobile communication device.

According to some embodiments of the present invention, the inventors have discovered that while sensor fusion of the non-RF sensors can be used in order to improve the accuracy of the positioning of the mobile communication device within the volume, the sensor fusion can be used together with the positioning of the PLU in order to classify the mobile communication device into a plurality of pre-defined modes of operation. This can be done either by classic classifiers or using machine learning techniques that involved training a model with datasets.

Figure 4:
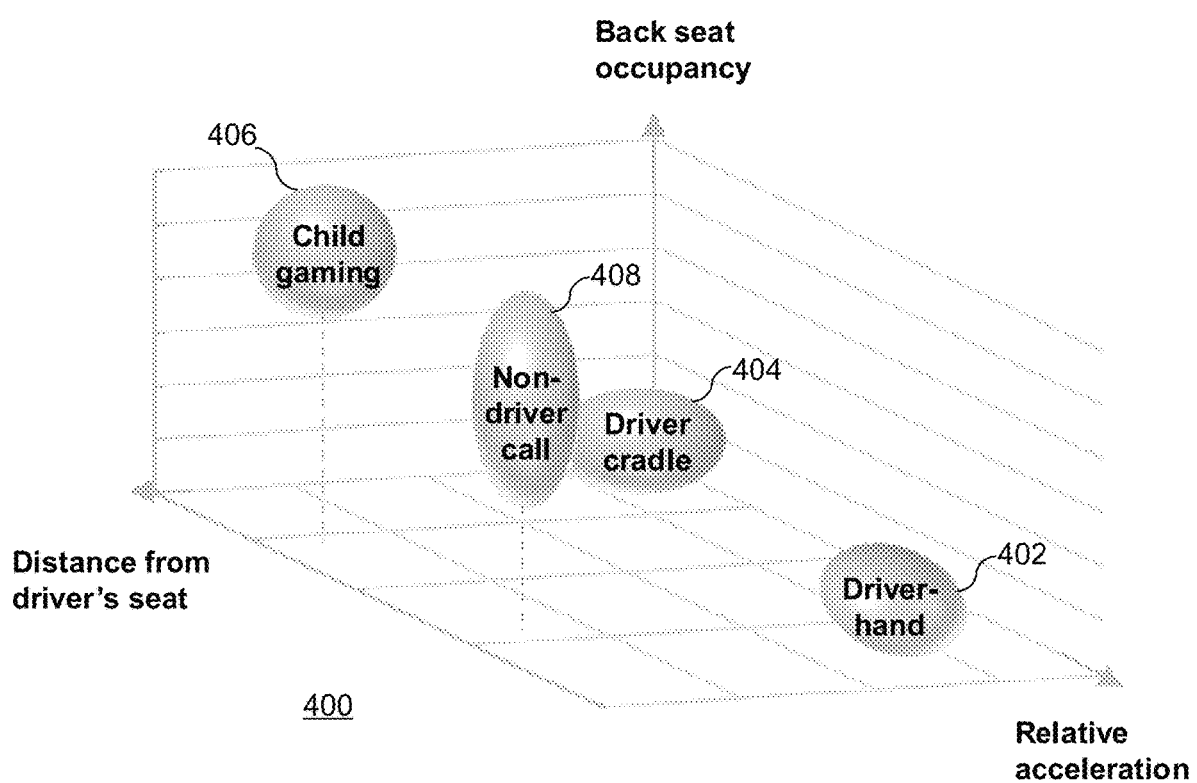
FIG. 4 is a graph showing an implementation of an N-dimensions classifier in accordance with some embodiments of the present invention.

FIG. 4 is a graph showing an implementation of an N dimensions classifier in accordance with some embodiments of the present invention. Multi-dimensional space 400 denotes the sensor measurement space in which readings of the location from the PLU (e.g. in the form of a vector denoting distance from the driver's canopy) as well as other sensor readings. By way of a non-limiting example, one further dimension may denote relative acceleration measured by differential IMU readings between an IMU on the mobile communication device and an IMU on the PLU. A further dimension may be pressure denoting the level of pressure applied on the back seats of a vehicle. It is understood that many more dimensions in the sensors space 400 may be used and calculated.

In accordance with some embodiments of the present invention, following a training session of datasets associated with measurements from relevant sensors, portions of the sensors space 400 can be allocated and designated as specific use cases and modes of operation associated with the one or more mobile communication devices within the volume.

For example, a portion of sensors space 400 where the distance from the driver's canopy is short, there is no pressure coming from the back seat and no relative acceleration of the mobile communication device infers that the driver's phone is held in a cradle 404. Same readings but with a high level of relative acceleration of the mobile communication device infer that the driver's phone is handheld 402.

Similarly, a high level of pressure at the back seat with a high level of acceleration and a long distance from the driver's canopy may infer that the phone is being held by a child in a gaming mode 406. Less pressure and less acceleration may infer a non-driver at an on-call mode 408.

It is understood that many more modes of operation may be mapped to a sensors space 400 having multiple sensor dimensions and some of the portions may be overlapping requiring to make classification decisions based on more parameters and other sensor readings.

It is further understood that some embodiments of the present invention may be embodied in the form of a system, a method, or a computer program product. Similarly, some embodiments may be embodied as hardware, software, or a combination of both. Some embodiments may be embodied as a computer program product saved on one or more non-transitory computer-readable medium (or mediums) in the form of computer-readable program code embodied thereon. Such non-transitory computer-readable medium may include instructions that when executed cause a processor to execute method steps in accordance with embodiments. In some embodiments, the instructions stored on the computer-readable medium may be in the form of an installed application and in the form of an installation package.

Such instructions may be, for example, loaded by one or more processors and get executed. For example, the computer-readable medium may be a non-transitory computer-readable storage medium. A non-transitory computer-readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units, and/or circuits have not been described in detail so as not to obscure the invention. Some features or elements described with respect to one embodiment can be combined with features or elements described with respect to other embodiments.

The invention claimed is:

1. A method of classifying a mode of operation of at least one mobile communication device within a defined volume, based on at least one sensor, the method comprising:
   determining, by a phone location unit, a position of the at least one mobile communication device relative to a frame of reference of the defined volume, based on at least one of: angle of arrival, time of flight, or received intensity of radio frequency (RF) signals transmitted by the at least one mobile communication device and received by the phone location unit located within the defined volume and comprising a transceiver and antennas and further configured to wirelessly communicate with the at least one mobile communication device;
   obtaining at least one sensor measurement related to the at least one mobile communication device, from a sensor located on at least one of: the at least one mobile communication device, within the defined volume, or outside of the defined volume; and
   using a computer processor to classify the at least one mobile communication device into at least one of a plurality of predefined modes of operation of the mobile communication device, based on the position and the at least one sensor reading,
   wherein inside the defined volume there is at least one person interacting with the at least one mobile communication device and wherein the mode of operation further comprises information about the at least one person, wherein the defined volume is a vehicle; and
   wherein the obtaining at least one sensor measurement related to the at least one mobile communication device is from a proximity sensor, said proximity sensor providing information on the proximity between the at least one mobile communication device and the at least one person, and wherein the proximity is factored in classifying the likelihood of the mode of operation, wherein a closer proximity infers a higher probability of an on-call mode of operation.

2. The method according to claim 1, wherein the classification by the computer processor is carried out by assigning to the at least one mobile communication device a respective likelihood, to at least one mode of operation selected from a plurality of modes of operation.

3. The method according to claim 1, wherein the modes of operation comprise at least one of: idle, on-call, sending a text message, audio input, touch screen in use, and streaming data.

4. The method according to claim 1, wherein the obtaining the sensor measurement related to the at least one mobile communication device is from at least two inertial measurement units (IMU), wherein at least one of the IMU is located on the mobile communication device and at least one of the IMUs is located on the vehicle, and wherein a differential measurement of the IMU is used to deduce internal movement of the at least one mobile communication device within the vehicle.

5. The method according to claim 1, wherein the position of the mobile communication unit within the defined volume is further determined to be in the vehicle's driver area, wherein the obtaining at least one sensor measurement related to the at least one mobile communication device is from a motion sensor, said sensor providing information related to the vehicle's speed and wherein the vehicle's speed is factored in classifying the likelihood of the mode of operation, wherein for a mobile communication device located in the driver's area, a higher speed infers a higher probability of idle mode of operation.

6. The method according to claim 1, wherein the vehicle comprises at least one seat with a pressure sensor indicating that said seat is occupied by the at least one person, and wherein the obtaining at least one sensor measurement related to the at least one mobile communication device is from a seat pressure sensor and wherein the seat pressure sensor indication is factored in classifying the likelihood of the mode of operation, wherein a positive indication of a seat pressure sensor infers a higher probability of a use of a mobile communicating device by the at least one person occupying that seat.

7. The method according to claim 1, wherein the at least one person is sensed by at least one vital signs sensor, and wherein the obtaining at least one sensor measurement related to the at least one mobile communication device is from at least one vital signs sensor and wherein a vital signs measurement is factored in classifying the likelihood of the mode of operation, wherein a level of vital signs outside a certain threshold or limit infers a higher probability of a non-idle mode of operation of the at least one mobile communicating device.

8. A system for classifying a mode of operation of at least one mobile communication device within a defined volume, based on at least one sensor, the system comprising:
   a phone locating unit configured to determine a position of the at least one mobile communication device relative to a frame of reference of the defined volume, based on at least one of: angle of arrival, time of flight, or received intensity of radio frequency (RF) signals transmitted by the at least one mobile communication device and received by the phone location unit located within the defined volume and comprising a transceiver and antennas and further configured to wirelessly communicate with the at least one mobile communication device;
   a plurality of non-RF sensors configured to obtain at least one sensor measurement related to the at least one mobile communication device, from a sensor located on at least one of: the at least one mobile communication device, within the defined volume, or outside of the defined volume; and
   a computer processor configured to classify the at least one mobile communication device into at least one of a plurality of predefined modes of operation of the mobile communication device, based on the position and the at least one sensor reading,
   wherein inside the defined volume there is at least one person interacting with the at least one mobile communication device and wherein the mode of operation further comprises information about the at least one person;
   wherein the defined volume is a vehicle; and
   wherein the obtaining at least one sensor measurement related to the at least one mobile communication device is from a proximity sensor, said proximity sensor providing information on the proximity between the at least one mobile communication device and the at least one person, and wherein the proximity is factored in classifying the likelihood of the mode of operation, wherein a closer proximity infers a higher probability of an on-call mode of operation.

9. The system according to claim 8, wherein the classification by the computer processor is carried out by assigning to the at least one mobile communication device a respective likelihood, to at least one mode of operation selected from a plurality of modes of operation.

10. The system according to claim 8, wherein the modes of operation comprise at least one of: idle, on-call, sending a text message, audio input, touch screen in use, and streaming data.

11. The system according to claim 8, wherein the obtaining the sensor measurement related to the at least one mobile communication device is from at least two inertial measurement units (IMU), wherein at least one of the IMU is located on the mobile communication device and at least one of the IMUs is located on the vehicle, and wherein a differential measurement of the IMU is used to deduce internal movement of the at least one mobile communication device within the vehicle.

12. The system according to claim 8, wherein the position of the mobile communication unit within the defined volume is further determined to be in the vehicle's driver area, wherein the obtaining at least one sensor measurement related to the at least one mobile communication device is from a motion sensor, said sensor providing information related to the vehicle's speed and wherein the vehicle's speed is factored in classifying the likelihood of the mode of operation, wherein for a mobile communication device located in the driver's area, a higher speed infers a higher probability of idle mode of operation.

13. The system according to claim 8, wherein the vehicle comprises at least one seat with a pressure sensor indicating that said seat is occupied by the at least one person, and wherein the obtaining at least one sensor measurement related to the at least one mobile communication device is from a seat pressure sensor and wherein the seat pressure sensor indication is factored in classifying the likelihood of the mode of operation, wherein a positive indication of a seat pressure sensor infers a higher probability of a use of a mobile communicating device by a person occupying that seat.

14. The system according to claim 8, wherein the at least one person is sensed by at least one vital signs sensor, and wherein the obtaining at least one sensor measurement related to the at least one mobile communication device is from at least one vital signs sensor and wherein a vital signs measurement is factored in classifying the likelihood of the mode of operation, wherein a level of vital signs outside a certain threshold or limit infers a higher probability of a non-idle mode of operation of the at least one mobile communicating device.

15. A non-transitory computer-readable medium for classifying a mode of operation of at least one mobile communication device within a defined volume, based on at least one sensor, the computer-readable medium comprising a set of instructions that when executed cause at least one computer processor to:
   determine a position of the at least one mobile communication device relative to a frame of reference of the defined volume, based on at least one of: angle of arrival, time of flight, or received intensity of radio frequency (RF) signals transmitted by the at least one mobile communication device and received by a phone location unit located within the defined volume and comprising a transceiver and antennas and further configured to wirelessly communicate with the at least one mobile communication device;
   obtain at least one sensor measurement related to the at least one mobile communication device, from a sensor located on at least one of: the at least one mobile communication device, within the defined volume, or outside of the defined volume; and
   classify the at least one mobile communication device into at least one of a plurality of predefined modes of operation of the mobile communication device, based on the position and the at least one sensor reading,
   wherein inside the defined volume there is at least one person interacting with the at least one mobile communication device and wherein the mode of operation further comprises information about the at least one person;
   wherein the defined volume is a vehicle; and wherein the obtaining at least one sensor measurement related to the at least one mobile communication device is from a proximity sensor, said proximity sensor providing information on the proximity between the at least one mobile communication device and the at least one person, and wherein the proximity is factored in classifying the likelihood of the mode of operation, wherein a closer proximity infers a higher probability of an on-call mode of operation.

16. A server for classifying a mode of operation of at least one mobile communication device within a defined volume, based on at least one sensor, the server comprising:
- a network interface configured to receive, from a phone location unit, a position of the at least one mobile communication device relative to a frame of reference of the defined volume, based on at least one of: angle of arrival, time of flight, or received intensity of radio frequency (RF) signals transmitted by the at least one mobile communication device and received by the phone location unit located within the defined volume and comprising a transceiver and antennas and further configured to wirelessly communicate with the at least one mobile communication device;
- a memory interface configured to store at least one sensor measurement related to the at least one mobile communication device, from a sensor located on at least one of: the at least one mobile communication device, within the defined volume, or outside of the defined volume; and
- a processing device configured to classify the at least one mobile communication device into at least one of a plurality of predefined modes of operation of the mobile communication device, based on the position and the at least one sensor reading, wherein inside the defined volume there is at least one person interacting with the at least one mobile communication device and wherein the mode of operation further comprises information about the at least one person;

wherein the defined volume is a vehicle; and wherein the obtaining at least one sensor measurement related to the at least one mobile communication device is from a proximity sensor, said proximity sensor providing information on the proximity between the at least one mobile communication device and the at least one person, and wherein the proximity is factored in classifying the likelihood of the mode of operation, wherein a closer proximity infers a higher probability of an on-call mode of operation.

* * * * *